United States Patent
Shutsa et al.

(10) Patent No.: US 12,235,836 B2
(45) Date of Patent: Feb. 25, 2025

(54) REPRESENTING LISTINGS FOR RESERVATIONS ON MAP

(71) Applicant: Airbnb, Inc., San Francisco, CA (US)

(72) Inventors: Adam James Shutsa, San Francisco, CA (US); Ang Li, Seattle, WA (US); Clarence Chin-wei Quah, San Francisco, CA (US); Devansh Gupta, Jersey City, NJ (US); Shuoyuan Lin, Seattle, WA (US); Hongru Hou, Beijing (CN); Hongwei Zhang, Saratoga, CA (US); Malay Haldar, Foster City, CA (US); Kedar Bellare, San Jose, CA (US); Shanni Weilert, San Jose, CA (US); Sherry Therese Chen, San Mateo, CA (US); Soumyadip Banerjee, Burlingame, CA (US); Surbhi Sethi, San Francisco, CA (US); Vivek Bhardwaj, San Jose, CA (US); Xiaotang Wang, San Francisco, CA (US); Yonghua Xu, Issaquah, WA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

(21) Appl. No.: 18/383,611

(22) Filed: Oct. 25, 2023

(65) Prior Publication Data
US 2024/0362211 A1    Oct. 31, 2024

Related U.S. Application Data

(63) Continuation of application No. PCT/CN2023/091125, filed on Apr. 27, 2023.

(51) Int. Cl.
*G06F 16/245* (2019.01)
*G06F 3/04817* (2022.01)
(Continued)

(52) U.S. Cl.
CPC ........ *G06F 16/245* (2019.01); *G06F 3/04817* (2013.01); *G06F 3/04842* (2013.01); *G06F 16/252* (2019.01)

(58) Field of Classification Search
None
See application file for complete search history.

(56) References Cited

U.S. PATENT DOCUMENTS

| | | | |
|---|---|---|---|
| 7,921,108 B2 * | 4/2011 | Wang | ...... G06F 16/29 707/723 |
| 8,909,680 B1 * | 12/2014 | Stolte | ...... G06F 16/24552 707/810 |

(Continued)

FOREIGN PATENT DOCUMENTS

CN    114090712 A    2/2022

OTHER PUBLICATIONS

"International Application Serial No. PCT/CN2023/091125, International Search Report mailed Jul. 5, 2023", 3 pgs.

(Continued)

*Primary Examiner* — Yu Zhao
(74) *Attorney, Agent, or Firm* — Schwegman Lundberg & Woessner, P.A.

(57) ABSTRACT

A system that enables searching for representing listings for accommodation reservations on a map is described. The system receives, by a network site of a listing network platform, input comprising search criteria associated with a geographical region and identifies a plurality of listings matching the search criteria. The system identifies a first subset listings of the plurality of listings that is each associated with a respective location that is within a boundary associated with the geographical region and a second subset listings of the plurality of listings that is each associated with a respective location that is outside the boundary associated with the geographical region. The system visually distin- (Continued)

guishes the first subset of listings from the second subset of listings on a map-based graphical user interface (GUI) that represents the plurality of listings matching the search criteria.

18 Claims, 10 Drawing Sheets

(51) Int. Cl.
   *G06F 3/04842* (2022.01)
   *G06F 16/25* (2019.01)

(56) References Cited

U.S. PATENT DOCUMENTS

| | | | |
|---|---|---|---|
| 2008/0104027 A1* | 5/2008 | Imler | G06F 16/9537 |
| 2008/0282187 A1* | 11/2008 | Buschman | G06F 3/0482 |
| | | | 707/E17.119 |
| 2010/0070487 A1 | 3/2010 | Fetsch | |
| 2010/0094548 A1* | 4/2010 | Tadman | G06F 16/29 |
| | | | 715/810 |
| 2014/0141812 A1 | 5/2014 | Cho | |
| 2017/0177619 A1 | 6/2017 | Georgiev et al. | |
| 2018/0112995 A1* | 4/2018 | Bortolussi | H04W 4/021 |
| 2019/0129998 A1* | 5/2019 | Kataria | G06Q 10/1053 |
| 2022/0391074 A1* | 12/2022 | Apuy | G06F 3/04883 |
| 2023/0393663 A1* | 12/2023 | Ellenby | G06F 16/24575 |

OTHER PUBLICATIONS

"International Application Serial No. PCT/CN2023/091125, Written Opinion mailed Jul. 5, 2023", 3 pgs.

* cited by examiner

REPRESENTING LISTINGS FOR RESERVATIONS ON MAP

PRIORITY

This application claims the benefit of priority from International Application No. PCT/CN2023/091125, filed Apr. 27, 2023, which is incorporated by reference herein in its entirety.

TECHNICAL FIELD

The present disclosure generally relates to special-purpose machines that manage data processing and improvements to such variants, and to the technologies by which such special-purpose machines become improved compared to other special-purpose machines for searching a property listings site for reservations.

BACKGROUND

Network site users can create content for viewing and interaction by other network site users (e.g., booking, registering, subscribing, viewing of listings). The posted content can be updated, created, or deleted, and it can be computationally challenging for a network site to return valid search results to network site users searching for content (e.g., listings for reservations) with specified parameters (e.g., dates, categories, prices, quantity). For example, if there are a large number of users posting and updating content and also a large number of users submitting complex searches for the posted content, any delay in computation due to query complexity may cause inaccurate results to be returned and cause large computational resource consumption (e.g., processing, memory, network overhead).

BRIEF DESCRIPTION OF THE DRAWINGS

Various ones of the appended drawings merely illustrate example embodiments of the present disclosure and should not be considered as limiting its scope.

Figure 5:
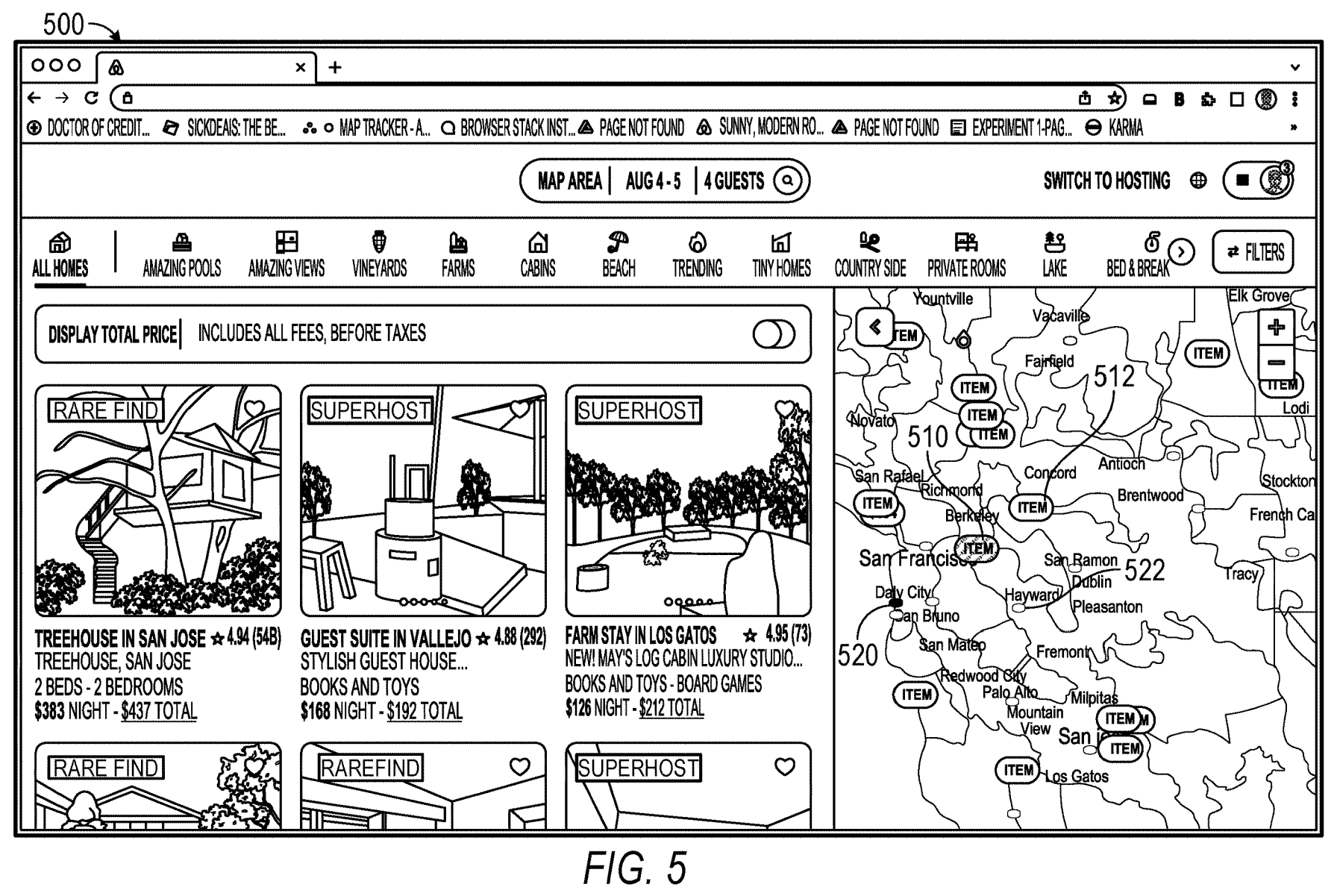

FIGS. 4-7 show example configurations and user interfaces of a listing search system, according to some examples.

DETAILED DESCRIPTION

Figure 1:
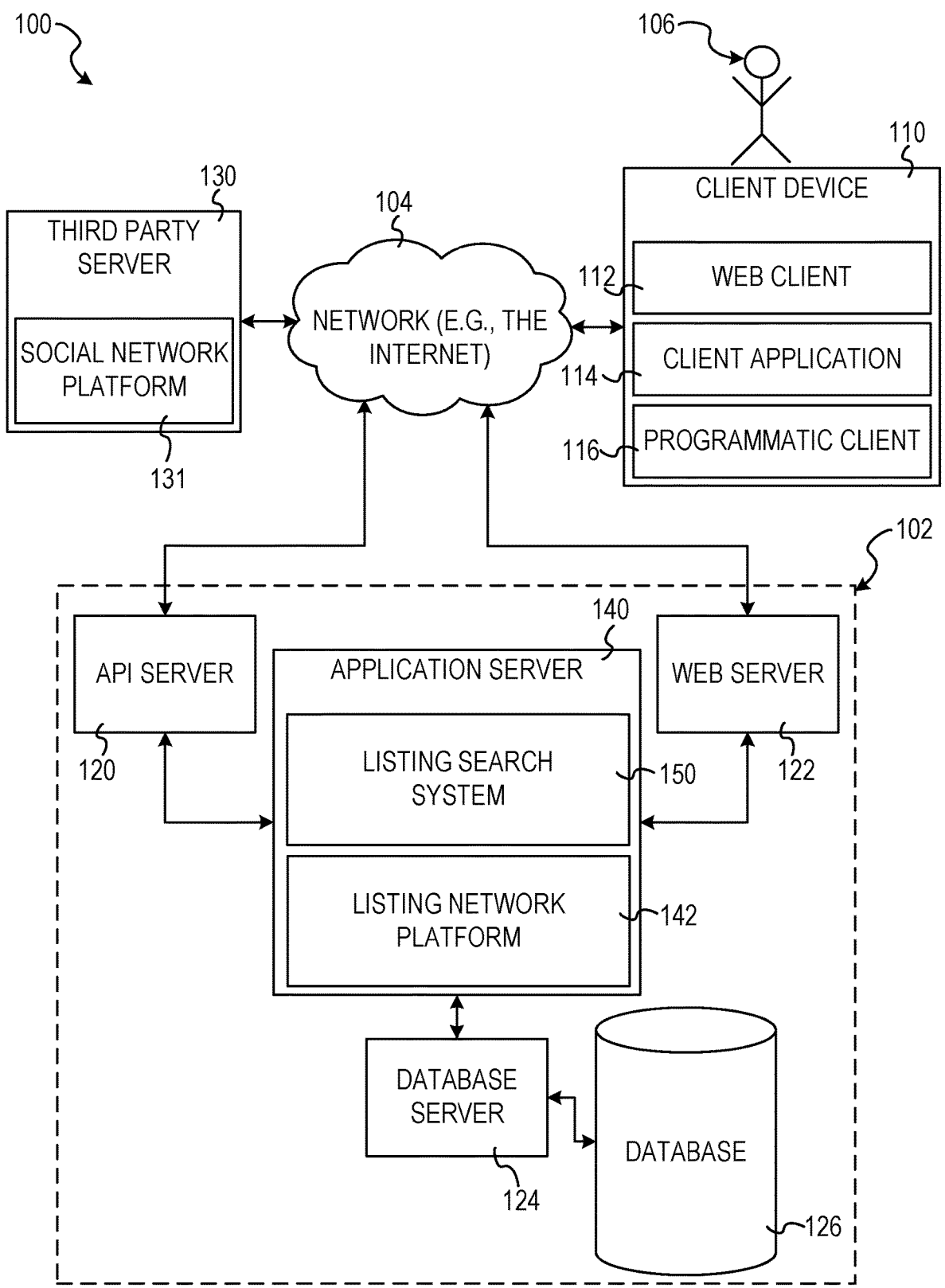
FIG. 1 is a block diagram illustrating a search and display system implemented in a networked environment, according to some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed above, it can be difficult to return up-to-date results for complex queries for content posted on a network site. In addition, navigating the vast array of content available on the network site can be very complex and time consuming. Such navigation can entail browsing multiple pages of information to find a suitable result or action. To this end, a search and display system can be configured to efficiently search for complex queries, allow browsing of a network site, and return accurate results and perform requested actions with low computational resource usage. Although in the following discussion the example posted content are accommodations listings (e.g., listings for reservations) posted on a network site for searching and interacting with other end users, other types of network site content posted by end users and searched for by other end users can likewise be implemented in the search and display system processes and methods, such as transportation, experiences, and/or events.

Generally, a listing platform can be searched for result listings that are available for a specified date range, price range, and/or other attributes (amenities, cancelation policy, etc.), which can be specified in a given query (e.g., text field, drop-down menu, checkbox filters). To search and browse the listing platform, users can access the listing platform on a particular user interface channel, such as by phone or through an application associated with the listing platform.

While some of the listing attributes are relatively static and common across the potential results and therefore fast to look up, pricing and date availability are highly dynamic because (1) pricing and date availability change frequently (e.g., the host of a listing updates an availability calendar, dynamic pricing changes due to demand and supply), and (2) the price and date availability attributes have a higher accuracy burden (e.g., searching end users have a low tolerance for pricing discrepancies). To address these issues, price and date availability attributes are handled at search time in response to handling each new query received through a particular user interface channel. This can consume a significant amount of computational resources. For example, the process of computing pricing and availability per listing can consume over 30% of search-serving CPU processing for regular queries (e.g., simple date range, finite price range, small geographic area).

Sometimes, these systems can use up the computational resources to find matching listings and may end up failing to identify a sufficient number of candidate matches. Such systems usually present search results in a particular ranked order using tiles representing each search result. The configuration of the tiles and the content presented in the tiles is usually the same so that the same information is available for a user to review for each corresponding result. The results presented to the user in this manner can therefore be minimal, which may cause the user to manually adjust search parameters in an attempt to find better matches. Namely, the display of the results is usually not tailored in any specific manner to draw a user's attention to one result over another. Once the search parameters are ultimately updated, the revision of the search parameters causes the systems to again consume a great deal of computational resources to find match results some of which may have been initially available in the initial search but not identified by the user because of lack of information contained in the corresponding tile for the result. In many cases, users may still be unsatisfied with the matches that are returned and may decide to manually shorten or extend the duration of stay. Such repetitive and manual processes are incredibly time consuming and can be very frustrating to end users. This can result in missed opportunities and wasted computational resources.

To address these technical problems, the disclosed techniques provide a network site that allows a user to interact with the listing network site and view search results in an efficient manner. Namely, the network site can receive input that includes search criteria and identifies a plurality of listings matching the search criteria including a specified geographical region. The network site can identify a plurality of listings matching the search criteria and can identify a first subset listings of the plurality of listings that is each associated with a respective location that is within a boundary associated with the geographical region and a second subset listings of the plurality of listings that is each associated with a respective location that is outside the boundary associated with the geographical region. The network site can then visually distinguish the first subset of listings from the second subset of listings on a map-based graphical user interface (GUI) that represents the plurality of listings matching the search criteria to aid the user in finding relevant listings.

This can help the user easily identify and select listings that may be of interest by highlighting those listings that match or satisfy a user's needs based on the search query on a map-based GUI. In this way, the network site can prevent having to execute additional search queries or refining an initial search query. This, in effect, reduces the amount of computational resources needed to be dedicated and consumed by a given searching end-user which frees up such resources for other tasks and satisfying other search requests.

With reference to FIG. 1, an example of a high-level client-server-based network architecture 100 is shown. A networked system 102, in the example form of a network-based listing services system, provides server-side functionality via a network 104 (e.g., the Internet or wide area network (WAN)) to one or more client devices 110. In some implementations, a user (e.g., user 106) interacts with the networked system 102 using the client device 110.

FIG. 1 illustrates, for example, a web client 112 (e.g., a browser), a client application(s) 114, and a programmatic client 116 executing on the client device 110. The client device 110 includes the web client 112, the client application(s) 114, and/or the programmatic client 116 alone, together, or in any suitable combination. Although FIG. 1 shows one client device 110, in other implementations, the network architecture 100 comprises multiple client devices.

In various implementations, the client device 110 can include a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box (STB), network personal computer (PC), mini-computer, and so forth. In an example, the client device 110 includes one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof. In communicating with the network 104 through the first user interaction channel, the client device 110 may only send audio or voice data to the network 104. In communicating with the network 104 through the second user interaction channel, the client device 110 may send data representing selections on a GUI, image content, and/or audio or voice data to the network 104.

In some examples, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, e-commerce site apps (also referred to as "marketplace apps"), and reservation applications for temporary stays or experiences at hotels, motels, or residences managed by other end users (e.g., a posting end user who owns a home and rents out the entire home or private room). In some implementations, the client application(s) 114 include various components operable to present information to the user and communicate with the networked system 102. In some examples, if the e-commerce site application is included in the client device 110, then this application is configured to locally provide the user interface and at least some of the functionalities with the application configured to communicate with the networked system 102, on an as-needed basis, for data or processing capabilities not locally available (e.g., access to a database of items available for sale, to authenticate a user, to verify a method of payment). Conversely, if the e-commerce site application is not included in the client device 110, the client device 110 can use its web browser to access the e-commerce site (or a variant thereof) hosted on the networked system 102.

The web client 112 accesses the various systems of the networked system 102 via the web interface supported by a web server 122. Similarly, the programmatic client 116 and client application(s) 114 accesses the various services and functions provided by the networked system 102 via the programmatic interface provided by an Application Program Interface (API) server 120.

Users (e.g., the user 106) can include a person, a machine, or other means of interacting with the client device 110. In some examples, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104 by way of the second user interaction channel. In this instance, the networked system 102, in response to receiving the input from the user 106, communicates information to the client device 110 via the network 104 to be presented to the user 106. In this way, the user 106 can interact with the networked system 102 using the client device 110. As another example, the user 106 provides input (e.g., speech input) to the client device 110 and the input is communicated to the networked system 102 via the network 104 in the form of audio packets or audio data.

The API server 120 and the web server 122 are coupled to, and provide programmatic and web interfaces respectively to, one or more application server(s) 140. The application server(s) 140 may host a listing network platform 142 and a listing search system 150, each of which comprises one or more modules or applications and each of which can be embodied as hardware, software, firmware, or any combination thereof. The application server(s) 140 are, in turn, shown to be coupled to one or more database server(s) 124 that facilitate access to one or more information storage repositories or database(s) 126. In an example, the database(s) 126 are storage devices that store information to be posted (e.g., inventory, image data, catalog data) to the listing network platform 142. The database(s) 126 also stores digital goods information in accordance with some examples.

Additionally, a social network platform 131 is illustrated as executing on third-party server(s) 130. Further, the social network platform 131 can programmatically access the networked system 102 via the programmatic interface provided by the API server 120. The social network platform 131 may include a social network website, messaging platform, and one or more APIs. In some examples, the electronic message discussed below is a message sent to a given user via the social network platform 131 messaging system (e.g., social media chat message, post, ping (a "hello" notification), and so on).

The listing network platform 142 provides a number of publication functions and listing services to the users who access the networked system 102. While the listing network platform 142 is shown in FIG. 1 to form part of the networked system 102, it will be appreciated that, in alternative examples, the listing network platform 142 may form part of a web service that is separate and distinct from the networked system 102.

While the client-server-based network architecture 100 shown in FIG. 1 employs a client-server architecture, the disclosed techniques are not limited to such an architecture, and can equally be implemented in a distributed, or peer-to-peer, architecture system, for example. The various systems of the applications server(s) 140 (e.g., the listing network platform 142 and listing search system 150) may also be implemented as standalone software programs, which do not necessarily have networking capabilities.

The listing network platform 142 can be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components access one or more database(s) 126 via the database server(s) 124. The listing network platform 142 provides a number of publishing and listing mechanisms whereby a seller (also referred to as a "first user," posting user, host) may list (or publish information concerning) goods or services for sale or barter, a buyer (also referred to as a "second user," searching user, guest) can express interest in or indicate a desire to purchase or barter such goods or services, and a transaction (such as a trade) may be completed pertaining to the goods or services.

Figure 2:
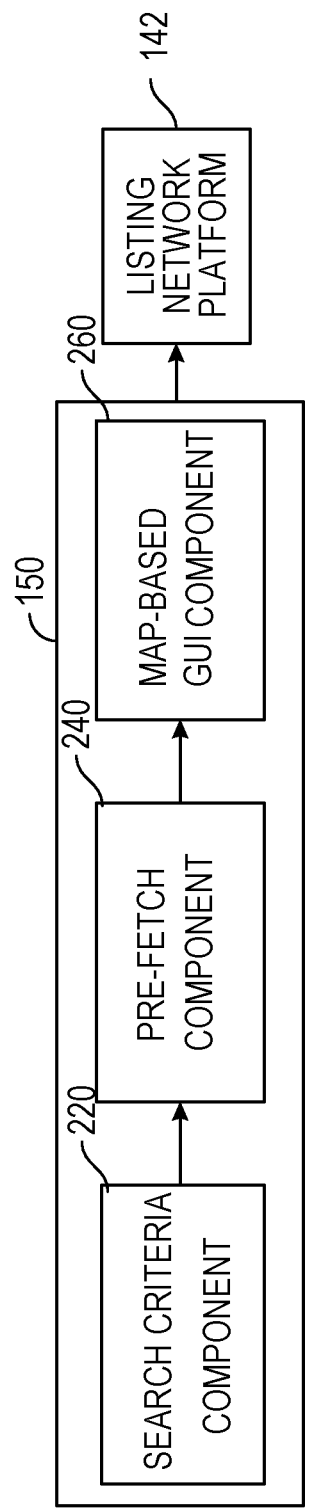
FIG. 2 shows an example of functional engines of a search and display system, according to some examples.

FIG. 2 shows example functional engines of the listing search system 150, according to some examples. As illustrated, the listing search system 150 includes a search criteria component 220, a pre-fetch component 240, and a map-based GUI component 260. In some examples, a user may desire to perform some action with the listing network platform 142. For example, the user may desire to search for a listing for a reservation, modify one or more reservations held by the listing network platform 142, list a reservation on the listing network platform 142, communicate with a host of a listing on the listing network platform 142, request a refund for a reservation on the listing network platform 142, pay for services on the listing network platform 142, and/or to perform any other available function on the listing network platform 142.

In such cases, a user may initiate contact with the listing network platform 142 through any number of user interaction channels. For example, the user can establish a first user interaction channel with the listing network platform 142 by placing a telephone call using the client device 110 to a service phone number associated with the listing network platform 142. In response to receiving the telephone call, the listing network platform 142 can search a database that associates a telephone number of the client device 110 with an account of the user on the listing network platform 142. As another example, the user can initiate contact with the listing network platform 142 by accessing a GUI associated with the listing network platform 142. Through the GUI, the user can input search criteria by typing in characters of a string that is used to search listings on the listing network platform 142. In some examples, the search criteria are supplied or transmitted from the client device 110 to the search criteria component 220.

In some cases, the search criteria can specify a specific geographical region of interest, such as by specifying a city name, a name of a landmark, GPS coordinates, drawing a circle or shape on a map-based GUI, or any other suitable method. The search criteria component 220 can receive the specified geographical region of interest and/or generate the region of interest by specifying meets and bounds or a range measured from a POI specified in the search criteria.

The search criteria component 220 can process the search criteria and can perform a search of the listings information stored in the listing network platform 142 to identify a plurality of listings that match the search criteria including finding listings that are associated with physical locations that are within a certain threshold or range of the specific geographical region of interest provided in the search criteria. The search criteria can be input by selecting certain drop-down options. For example, the search criteria can define various attributes, such as a quantity of adults, a quantity of children and/or their respective ages, a minimum and/or maximum duration of stay, and so forth.

In some examples, the search criteria component 220 can continuously monitor characters that are being typed into the GUI of the client device 110. The search criteria component 220 can continuously search a list of POIs based on one or more partially complete words of the search criteria as the search criteria is being input. The search criteria component 220 can search different types of POIs and organize the different types of POIs into a window for presentation to a user of the client device 110. In this way, as the user types in characters of the search criteria, preliminary results are presented to the user to allow the user to autocomplete the search criteria. For example, if the user is typing in the word "pari," the search criteria component 220 can initiate a search for the POIs and identify a plurality of POIs associated with a portion of the incomplete word that is typed in "pari" corresponding to the complete word "Paris."

The search criteria component 220 can also present a search results region in the GUI. The search results region can present a list of graphical objects each associated with a respective one of the identified plurality of listings. The graphical objects can include detailed information about each listing that matches the search criteria, such as an image, video, description, and so forth. The search criteria component 220 can access the pre-fetch component 240 to control selectively and conditionally presenting one or more amenities within one or more of the graphical objects in the GUI.

In some examples, the search criteria component 220 can present a map-based GUI together with the list of graphical objects. Namely, the search criteria component 220 can generate a map for display that is centered on the specific geographical region of interest provided in the search criteria. The search criteria component 220 can set a zoom level of the map displayed in the map-based GUI to a default or user-specified value. The search criteria component 220 can then communicate with the map-based GUI component 260 to generate representations of each listing that is in the search results region, such as the listings discussed in connection with FIG. 3.

Figure 3:
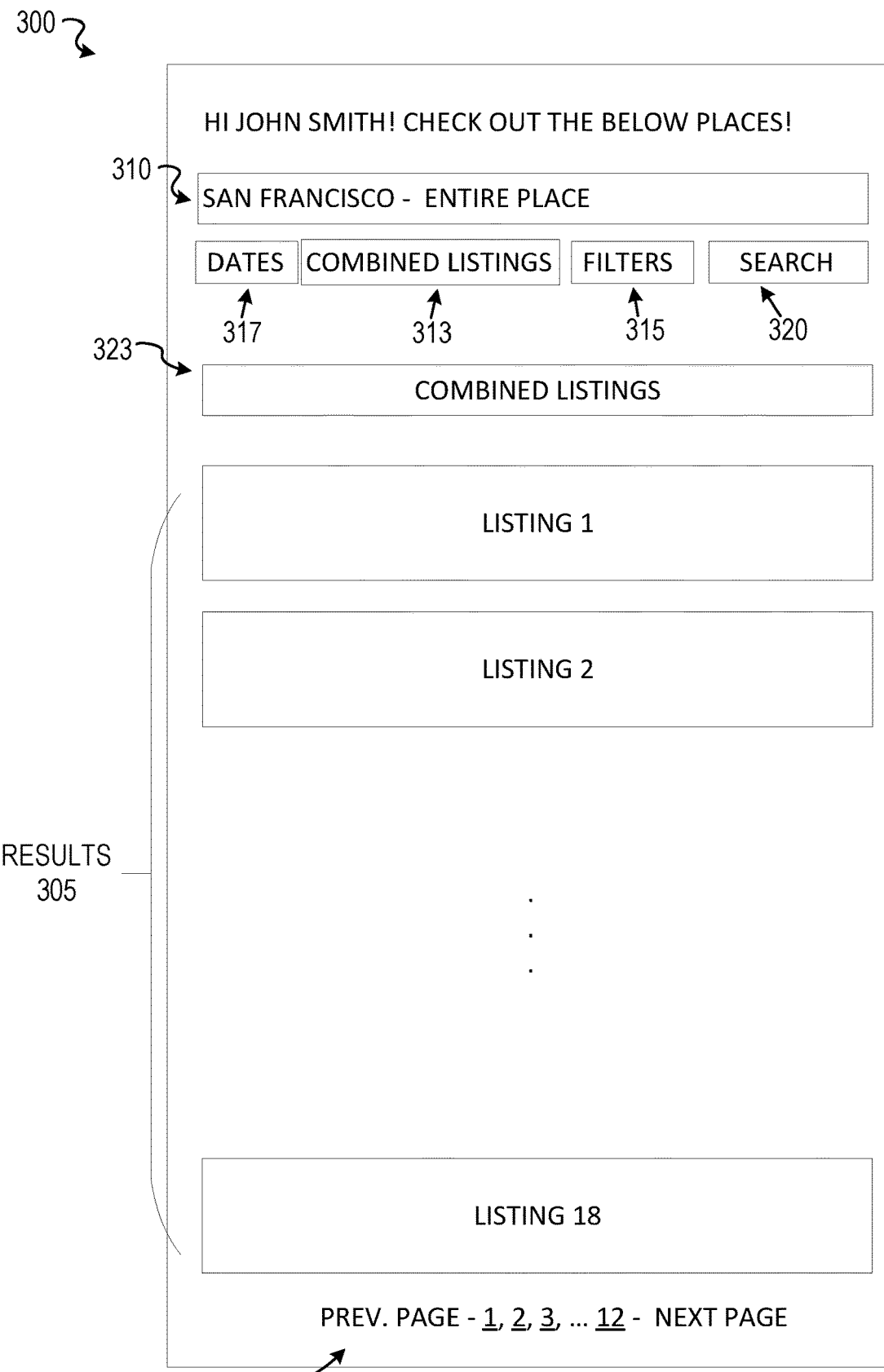
FIG. 3 shows a listings network site user interface generated by the listing network platform and search and display system (or listing search system), according to some examples.

FIG. 3 shows a listings network site user interface 300 (e.g., mobile application user interface, web browser user interface) generated by the listing network platform 142 and listing search system 150, according to some examples. The user interface 300 can be presented by the programmatic client 116 implemented on the client device 110. As illustrated, the user interface 300 includes a search field 310, a filters menu element 315 (e.g., place type, amenities), and a search button 320. The user enters a listings query into the search field 310, such as a search for temporary housing in San Francisco, and a category limitation from the filters menu element 315 of "Entire Place" (e.g., the user seeks to rent the entire residence for said dates, as opposed to renting a private room in another person's residence). The user can customize the query directly using terms input into the search field 310 or filters listed via selection of the filters menu element 315. Further, the user can select dates using the dates drop-down element 317 to select a specific date range for the temporary stay. For example, the user can select the dates drop-down element 317 and a pop-up calendar (not depicted in FIG. 3) to specify the stay in San Francisco is to be specifically from Jul. 16, 2021 to Jul. 18, 2021. In some cases, the user can provide one or more attributes of the search query using the filters menu element 315, such as specifying ages of children and minimum/maximum duration of stay.

Upon submitting the query (e.g., via selection of the search button 320, or automatically upon selecting the combined listings element 313 (split stays option) or dates drop-down element 317, a communication is sent from the programmatic client 116 to the listing search system 150. The listing search system 150 generates an output that includes a results display of the listings (e.g., graphical objects) matching the query and transmits the output to the programmatic client 116.

The results are then displayed in the listings results area 305 using respective graphical objects (also referred to as indicators of listings). The user can then select the graphical objects for the listings or navigate to additional pages via page navigational elements 325. In some examples, the user interface 300 includes a set of combined listings 323 together with individual listings displayed in the results area 305. The combined listings 323 can be positioned within the display in a dedicated area, on top of the individual listings, between two individual listings, and/or underneath the individual listings. In some examples, the combined listings 323 are provided in response to receiving input that selects the combined listings element 313. In some examples, the combined listings 323 are presented automatically without receiving input that selects the combined listings element 313.

In some examples, the combined listings 323 are displayed in different slots or portions of the display relative to other individual listings on the basis of the type of client device being used to access the system. For example, on a mobile device, the combined listings 323 can be placed in slots 3, 6, 9, and 12 on the first page, and on a desktop computer, the same combined listings 323 may be presented in slots 5, 9, 14 and 20 for better visual balance. As referred to herein, the term "slots" means an area of a display in which a category is presented. In some cases, the combined listings 323 are excluded from being presented for last minute stays, such as if the travel dates are within 48 hours of check in or starting the trip. In some examples, the combined listings 323 include individual listings of destinations or stays that are at least two hours driving distance apart but no more than 10 hours driving distance apart. In some examples, the combined listings 323 excludes repeating pairs of the same individual listings. In some examples, the combined listings 323 relate to pairs of individual listings from different neighborhoods and locations. In such cases, neighborhoods and listings can be repeated across pairs of combined listings 323.

Using a specific example, a listing request can be received for a one-month stay in Kauai specifying beachfront homes. In this example, the user identifies only three individual listings that meet these search parameters but identifies ten additional stays as combined listings 323. The combined listings 323 can represent opportunities to experience different sides of the island throughout the trip and can include an option to split time between two cities (e.g., Koloa and Hanalei), split time between two other cities (e.g., Koloa and Lihue), split time between two listings that are 1 mile apart in Koloa, split time in related cites (e.g., Poipu and Princeville) and/or related cities (e.g., Lihue and Princeville), and so forth. The result of selecting the combined listings element 313 or the user automatically identifying combined listings without having a combined listings element 313 can provide 40% more unique inventory for the user to select that would be excluded if only individual listings were presented.

In some examples, the combined listings 323 presentation can vary based on the type of category selected. For example, if a national parks category is selected, the combined listings 323 can include two different national park points of interest that are at least two hours' drive apart and a maximum of 10 hours' drive apart. In some cases, if the national parks are very remote, they can still be paired even if their distances exceed these thresholds. The combined listings 323 graphical representation can visually identify the two national park listings that form part of the same combined listing without specifying the region/city name.

As another example, if a surfing category is selected, two different surfing destinations can be selected that are two hours' drive apart and a maximum of 10 hours' drive apart. The combined listings 323 graphical representation can visually identify the two surfing destinations that form part of the same combined listing using the region/city name.

In some examples, the user interface 300 visually distinguishes those listings in the user interface 300 that are associated with locations that are within a specified range of the specific geographical region of interest from those listings that are associated with locations that are outside the specified range. The visual distinguishing can take place by presenting the listings using different font styles, font sizes, font colors, or presenting the listings in different display regions.

Referring back to FIG. 2, the search criteria component 220 can communicate with the map-based GUI component 260 to generate the visual distinction between listings that are presented on a display, such as user interface 300. Specifically, the search criteria component 220 can provide to the map-based GUI component 260 a list of search results that include listings that match at least a portion of the search criteria. The search criteria component 220 can also provide to the map-based GUI component 260 the specific geographical region of interest provided in the search criteria.

The map-based GUI component 260 can then generate a shape or border that defines a target region for highlighting certain listings around the specific geographical region of interest and within a specified distances of the specific geographical region of interest. The map-based GUI component 260 can then search the search results to identify a first set of listings of the plurality of listings that is each associated with a respective location that is within a boundary associated with the geographical region. For example, the map-based GUI component 260 can identify the first set of listings that are associated with physical locations that are within the specified distance of the specific geographical region of interest. Similarly, the map-based GUI component 260 can search the search results to identify a second set of listings of the plurality of listings that is each associated with a respective location that is beyond or outside the boundary associated with the geographical region. For example, the map-based GUI component 260 can identify the second set of listings that are associated with physical locations that are outside the specified distance of the specific geographical region of interest.

The map-based GUI component 260 can then generate a first set of visual indicators (e.g., a first set of pins) to represent each of the first set of listings. The first set of visual indicators can be of a first type. The first type of visual indicator is referred to as an information pin. The information pin can be used to represent visually a location of a corresponding listing on a map-based GUI and can also provide one or more items of information associated with the listing, such as a size of the property, an address, a name, a price, a review, a rating, an owner, and/or any combination thereof.

The map-based GUI component 260 then generate a second set of visual indicators (e.g., a second set of pins) to represent each of the second set of listings. The second set of visual indicators can be of a second type. The second type of visual indicator is referred to as a mini pin. The mini pin can be used to represent visually a location of a corresponding listing on a map-based GUI without providing any of the one or more items of information associated with the listing, such as a size of the property, an address, a name, a price, a review, a rating, an owner, and/or any combination thereof. The mini pin can be visually smaller than the information pin when displayed on a map-based GUI.

The map-based GUI component 260 can provide the information pins and the mini pins back to the search criteria component 220. The search criteria component 220 can then generate a map-based GUI on which the information pins and the mini pins are overlaid at respective locations of the listings. In some examples, a mini pin can be converted to an information pin in response to user input. For example, the map-based GUI component 260 can detect input that interacts with the map-based GUI that is presented on which the information pins and the mini pins are displayed.

The map-based GUI component 260 can determine that the input zooms in or navigates the map to center the map on a different location. The map-based GUI component 260 can determine that a particular listing that was previously outside of a boundary associated with the search criteria location is now within the boundary. In such cases, the visual indicator (e.g., the mini pin) that was used to previously represent the particular listing on the map-based GUI is changed to a different type. For example, the map-based GUI component 260 can generate the mini pin to represent the particular listing when the map is initially presented because the location of the particular listing is beyond a certain range from the center of the map or is beyond a boundary associated with the location in the search criteria. Later, the map-based GUI component 260 can detect input that changes the boundary or the center of the map to bring the particular listing location to be within the range. In response, the map-based GUI component 260 can replace the mini pin used to represent the particular listing with an information pin. In such cases, the one or more items of information can be presented in the information pin which were not previously presented.

In some examples, the map-based GUI component 260 can vary the presentation style or visual attribute of the information pins and/or the mini pins based on user interactions with listings associated with such pins. For example, the map-based GUI component 260 can receive input that selects a first listing that is represented on the map-based GUI. The map-based GUI component 260 can identify an information pin that is associated with the first listing. In response to determining that the first listing has been interacted with by the user (e.g., the user has viewed the first listing or selected the first listing), the map-based GUI component 260 can change a color or visual attribute or items of information contained in the information pin for the information pin used to represent the first listing. This helps the user distinguish pins on the map-based GUI for which listings that have been previously accessed or viewed from pins on the map-based GUI for which listings that have not been previously accessed or viewed. As another example, the map-based GUI component 260 can receive input that selects a second listing that is represented on the map-based GUI. The map-based GUI component 260 can identify a mini pin that is associated with the second listing. In response to determining that the second listing has been interacted with by the user (e.g., the user has viewed the first listing or selected the first listing), the map-based GUI component 260 can change a color or visual attribute of the mini pin used to represent the second listing.

In some examples, the map-based GUI component 260 can visually distinguish representations of listings on the map-based GUI based on ranking information (e.g., the user rating of the corresponding listing and/or the number of reviews) and/or quantity of listings available in a given geographical region. For example, the map-based GUI component 260 can represent listings that are associated with ranking information that satisfies a ranking criterion (e.g., a rank of the listings transgresses or exceeds a rank threshold) on a map-based GUI with information pins. The map-based GUI component 260 can represent listings that are associated with ranking information that fails to satisfy the ranking criterion (e.g., a rank of the listings fails to transgress or exceed the rank threshold) on a map-based GUI with mini pins.

To do so, the map-based GUI component 260 can select a set of listings in a defined area (e.g., the boundary generated based on the search criteria or some other area) that correspond to a search query. The map-based GUI component 260 can then access or compute ranking information for each of the set of listings in the defined area. The map-based GUI component 260 can compare the ranking information for the select set of listings to a ranking criterion. Any listing in the select set of listings that is associated with ranking information that satisfies the ranking criterion (e.g., if the listing has a rating above a certain minimum rating or if the listing has been booked at a frequency that transgresses a minimum frequency or number of times within a given period) can be associated with or represented by an information pin. Any listing in the select set of listings that is associated with ranking information that fails to satisfy the ranking criterion can be associated with or represented by a mini pin. In this way, the map-based GUI component 260 can visually distinguish on the map-based GUI those listings in a particular region that are ranked above a threshold from those that are ranked below, such as by using different types of pins.

In some examples, the map-based GUI component 260 can selectively cause some listings in a certain area of the map-based GUI to be represented using information pins while other listings in the same area are represented using mini pins or not at all based on a density or quantity of listings in the area that are available. Namely, the map-based GUI component 260 can determine if the number of available listings matching the search criteria in the certain area is above a specified threshold. In response to determining that the number of available listings matching the search criteria in the area is above a specified threshold (e.g., a minimum threshold), the map-based GUI component 260 can then access ranking information for those listings. The map-based GUI component 260 can then condition the display of mini pins on the ranking information. For example, if the listing is associated with a rating that transgresses a minimum rating threshold and/or if the listing is associated with a frequency of reservations or bookings that exceed a minimum frequency of reservations or bookings and/or if the listing has a minimum number of reviews, the map-based GUI component 260 can associate the listing with an information pin rather than a mini pin.

For example, the map-based GUI component 260 can cause to be displayed in the certain area of the map-based GUI only information pins to represent listings when the number of available listings matching the search criteria in the certain area is above a specified threshold. The listings selected to be included and represented by the information pins can be based on the ranking information. For example, the map-based GUI component 260 can compare the ranking information for each listing matching the search criteria in the certain area to a ranking criterion. The map-based GUI component 260 can select a specified number of listings associated with ranking information that satisfies the ranking criterion and can represent these listings with information pins. Any listing in the certain area that matches the search criteria and that has ranking information that fails to satisfy the ranking criterion is represented by mini pins or is excluded entirely from being represented in the map-based GUI.

In some examples, the map-based GUI component 260 can identify a region of the map-based GUI that includes less than a threshold quantity of listings that match the search criteria and that have ranking information that satisfies a ranking criterion. In such cases, the map-based GUI component 260 can generate for display representations of all listings in the region using the mini pins instead of using information pins. Alternatively, the map-based GUI component 260 can generate for display representations of all listings in the region that includes less than the threshold quantity of listings that match the search criteria and that have ranking information that satisfies the ranking criterion using the information pins instead of using mini pins.

Figure 4:
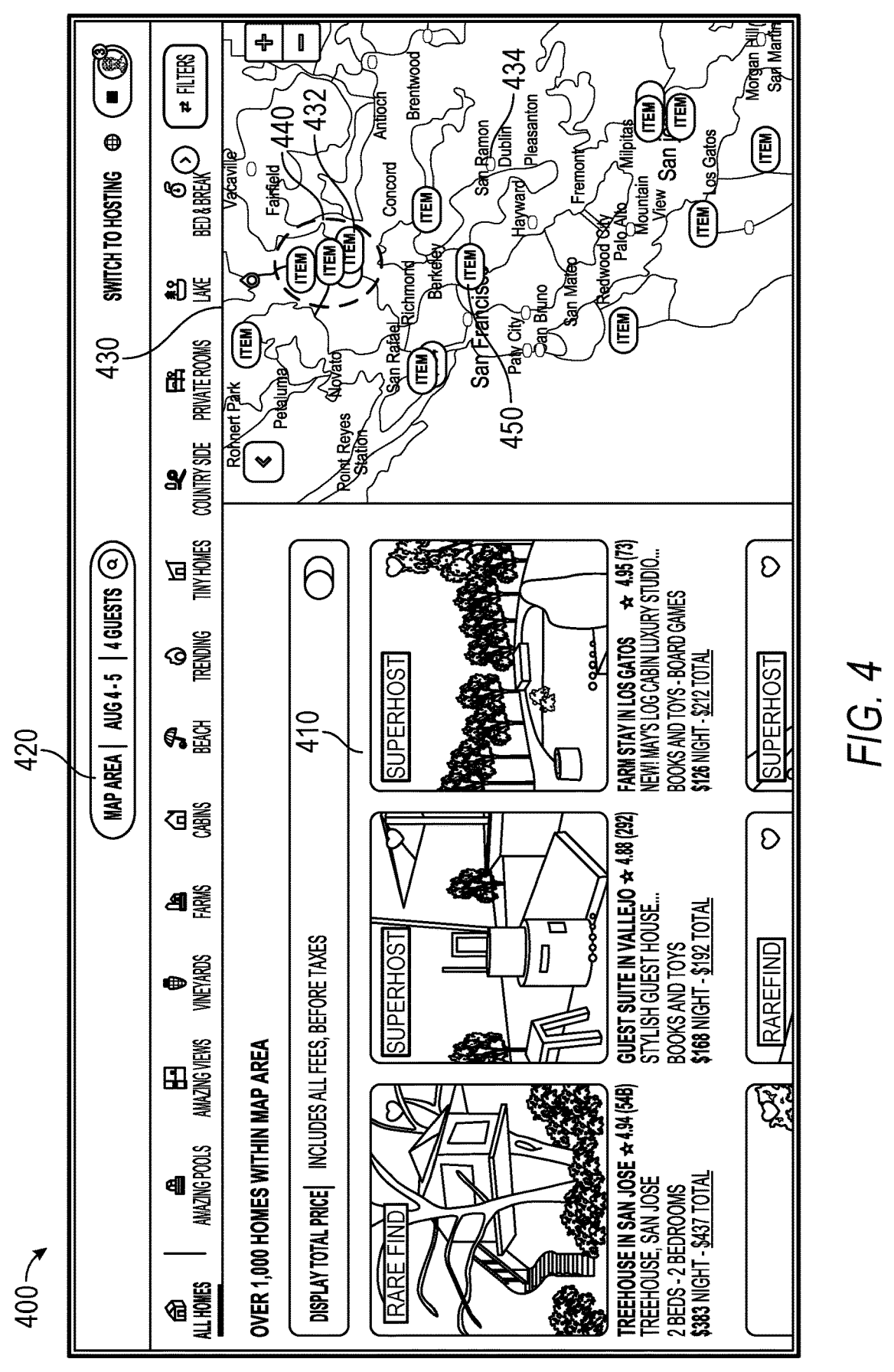

For example, as shown in FIG. 4, a GUI 400 is presented that includes a search input region 420, a results display 410, and a map display 430. The results display 410 can be generated by the search criteria component 220 based on processing search criteria received in the search input region 420. The input region 420 can be used to define a geographical region of interest in which to search for listings and that can be used to center a map-based GUI. The search criteria component 220 can include various graphical objects in the results display 410 each associated with a listing that has listing information matching the search criteria received in the search input region 420.

The search criteria component 220 can present in the map display 430 a list of pins (including information pins and/or mini pins) or indicators of locations associated with each listing in the results display 410. Specifically, the search criteria component 220 can display a map in the map display 430 at a particular zoom level. The search criteria component 220 can access location information from each listing in the results display 410. The search criteria component 220 can access a cost or price or any other item of information associated with each listing in the results display 410. The search criteria component 220 can then generate an information pin or mini pin or identifier for each listing and place that pin or identifier at a particular location on the map in the map display 430 associated with the location information of the listing. This identifies to a user visually where on a given region of a map different listing search results match the search criteria. The pin or identifier that is displayed can provide the item of information associated with the respective listing.

In some examples, the map display 430 can define a region 440 that satisfies the search query. The region 440 can include meets and bounds defined by a particular shape. The search criteria component 220 can visually distinguish pins that correspond to listing locations that are within the region 440 from those that listing locations that are outside of the region 440. For example, the search criteria component 220 can present one or more information pins 432 to represent listings associated with locations that are within the region 440. The search criteria component 220 can present mini pins, such as mini pin 434 to represent listings associated with locations that are outside of the region 440. As mentioned above, the mini pins and/or information pins 432 can be presented on the basis of ranking information and/or quantity of listings available in a specified region. For example, the information pin 432 can be presented for a first listing having ranking information that satisfies a ranking criterion. For example, the mini pin 434 can be presented for a second listing having ranking information that fails to satisfy the ranking criterion. The first and second listings can both be associated with locations that are within a boundary of the map-based GUI.

In some cases, the map-based GUI component 260 can detect input that selects a given pin 450 associated with a particular listing. In response, the map-based GUI component 260 can update the map-based GUI as shown in user interface 500. In some cases, the map-based GUI component 260 can present information associated with the particular listing in full screen or in a window overlaid on the map-based GUI in response to detecting the input that selects the given pin 450. The updated map-based GUI can present the same given pin 450 with a different display attribute using the updated pin 510. For example, the updated pin 510 can present the same items of information as the given pin 450 but in a different color and/or font. The updated pin 510 can be populated with a different color than given pin 450 to indicate that the listing associated with the given pin 450 has been previously viewed and/or selected. This visually distinguishes the updated pin 510 (e.g., updated information pin) representing a listing viewed and/or accessed by the user from another information pin 512 representing a listing that has not been viewed and/or accessed by the user. Similar to the visually distinguishing of the information pins, the user interface 500 can visually distinguish a first mini pin 520 that corresponds to a listing previously viewed and/or accessed by the user from a second mini pin 522 that corresponds to a listing not previously viewed and/or accessed by the user.

Referring back to FIG. 2, the pre-fetch component 240 can be used by the search criteria component 220 to search regions of the map-based GUI that are not currently being presented to pre-fetch predictively listings for other regions of the map. For example, the pre-fetch component 240 can receive a region of a map that defines a boundary of the map that is being currently displayed in the map-based GUI. The pre-fetch component 240 can also receive search criteria and obtain a threshold distance or compute a threshold distance based on a user profile.

The pre-fetch component 240 can then search for additional listings that satisfy the search criteria and that are associated with locations that are outside of the current boundary of the map that is displayed by a distance corresponding to the threshold distance. Namely, the pre-fetch component 240 can draw a virtual outer boundary between the boundary of the map that is currently displayed and that extends beyond the boundary by the threshold distance. The pre-fetch component 240 can search for listings that satisfy the search criteria and that are within the region defined between the boundary of the map currently displayed and the outer boundary. These additional listings can be stored in a pre-fetch memory.

The pre-fetch component 240 can detect input from the user that navigates or moves the map to cause at least a portion of the region between the current boundary and the outer boundary to be displayed. In response, the pre-fetch component 240 can obtain a portion of the pre-fetched listings for immediate display on the newly displayed portion of the map. This avoids the need to perform an updated search for listings that match the search criteria and that are associated with locations corresponding to the newly displayed location on the map. In some cases, the different map boundaries can correspond to different zoom levels. In such cases, the pre-fetch component 240 can search for additional listings that correspond to a closer or further zoom level than that which is currently being displayed. Namely, if the user zooms the map out of view, additional geographical regions of the map can be caused to be presented. The pre-fetch component 240 can pre-fetch additional listings corresponding to the additional geographical regions before receiving input from the user to zoom the map out. Similarly, if the user zooms the map into view, additional geographical regions of the map can be caused to be presented. The pre-fetch component 240 can pre-fetch additional listings corresponding to the additional geographical regions before receiving input from the user to zoom the map in. This saves computational resources and avoids delays in presenting results to the user. Additionally, user input to re-search a newly displayed map area may not be needed to be received to search for the new listings as such listings are predictively searched by the pre-fetch component 240.

Figure 6:
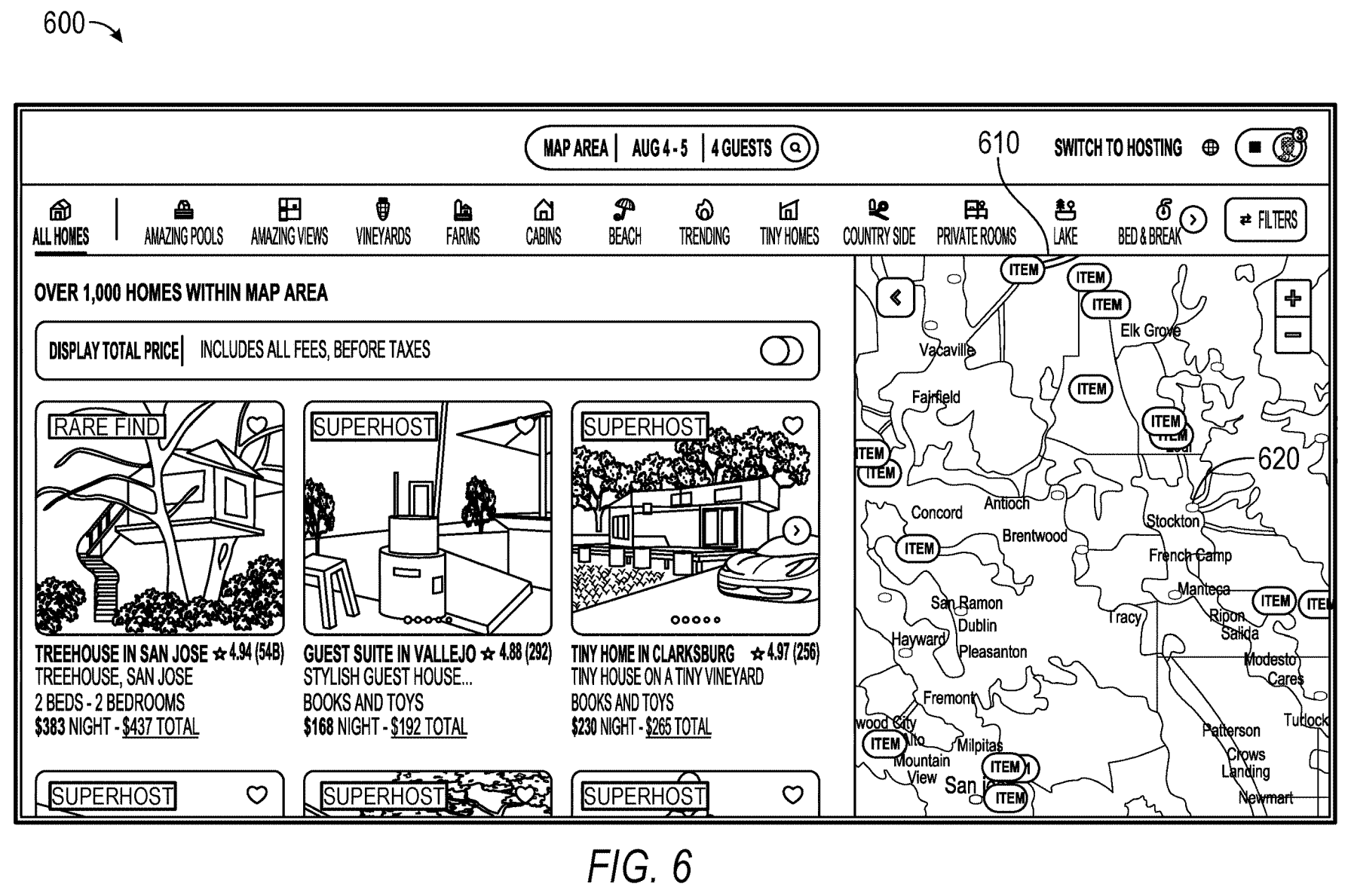
Figure 7:
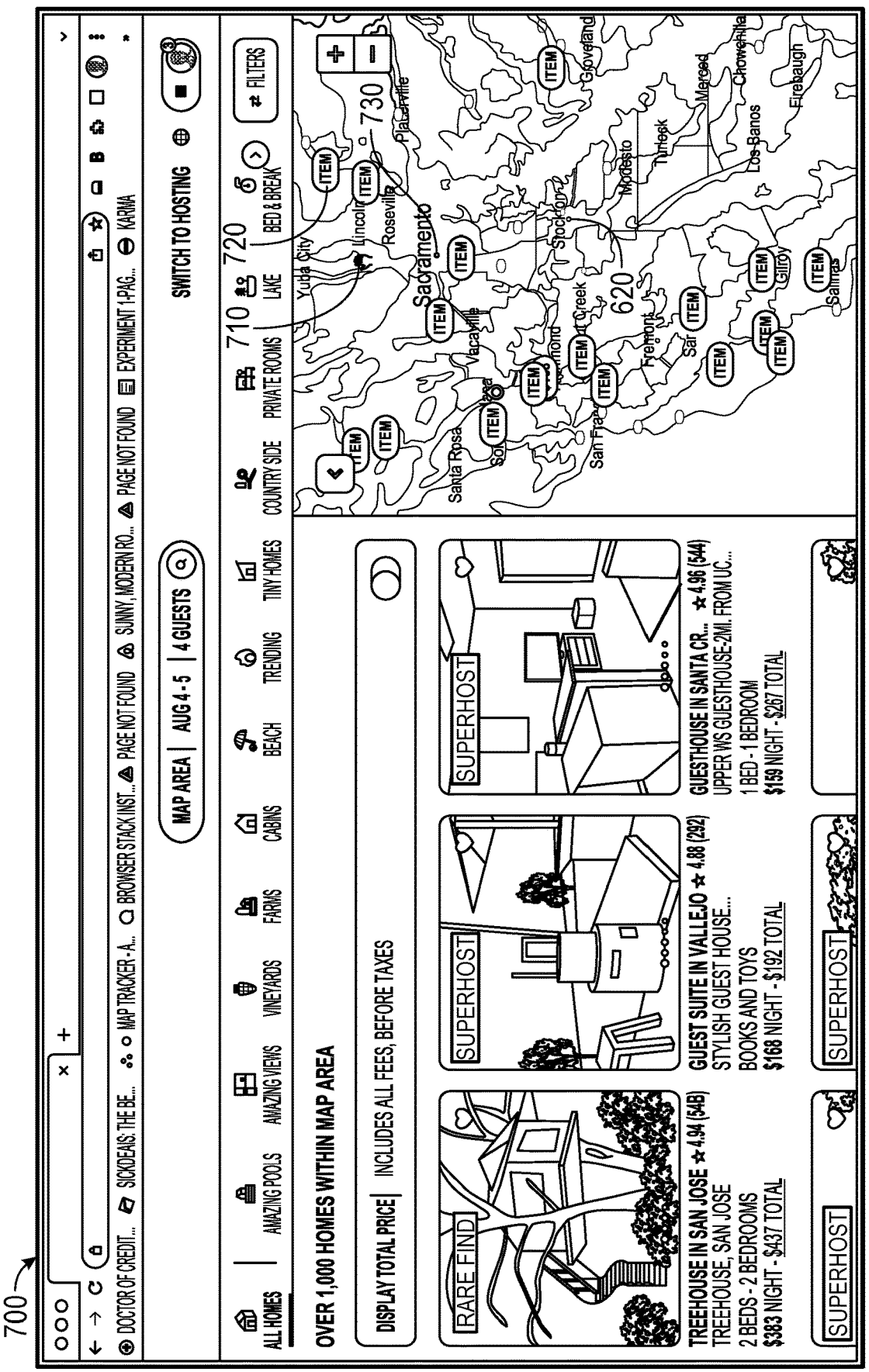

For example, as shown in FIG. 6, a user interface 600 is presented with a map-based GUI 610. The map-based GUI 610 can present search results corresponding to a current boundary of the map. The search results can include a first mini pin or information pin corresponding to a first city 620. While this map view is being presented, additional listings from surrounding areas not currently in view of the map are searched for by the pre-fetch component 240. In this way, as shown in FIG. 7, when input is received from the user using a cursor 710 dragging the map to the surrounding areas, the additional pins 720 corresponding to the pre-fetched listings can be presented with minimal or no delay and without having to research the listings based on the search criteria and the updated location. The map can be dragged to reveal a new city 730 and search results including the additional pins 720 can be presented to the user.

Figure 8:
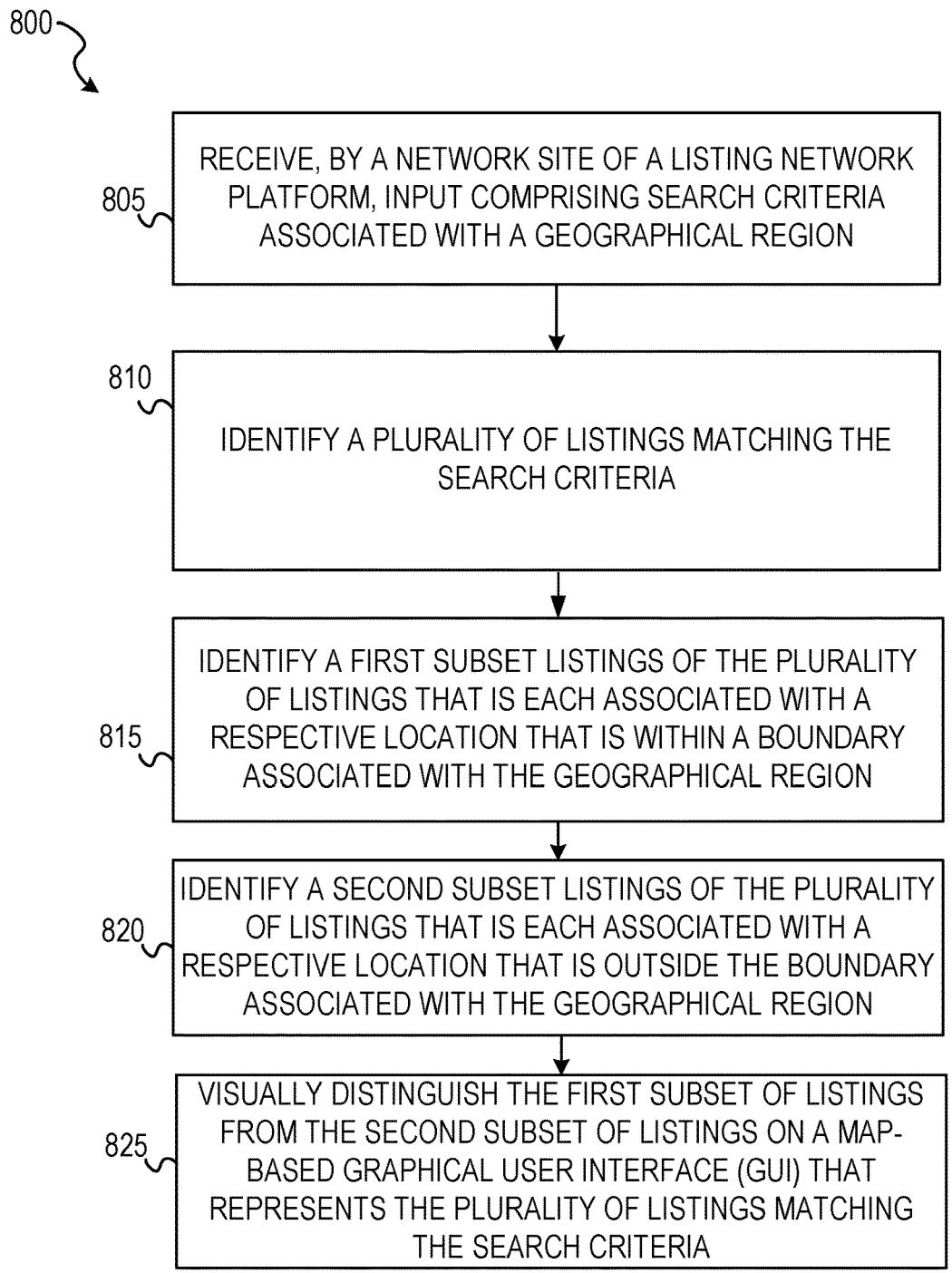
FIG. 8 shows a flow diagram of various processes and methods for searching listings on the listing network site, according to some example embodiments.

FIG. 8 shows a flow diagram of various processes and methods 800 for searching a listing network site, according to some examples. These processes and methods 800 can be performed by any component discussed above or below, such as the listing search system 150.

At operation 805, the listing search system 150 receives, by a network site of a listing network platform, input comprising search criteria associated with a geographical region, as discussed above.

At operation 810, the listing search system 150 identifies a plurality of listings matching the search criteria, as discussed above.

At operation 815, the listing search system 150 identifies a first subset listings of the plurality of listings that is each associated with a respective location that is within a boundary associated with the geographical region, as discussed above.

At operation 820, the listing search system 150 identifies a second subset listings of the plurality of listings that is each associated with a respective location that is outside the boundary associated with the geographical region, as discussed above.

At operation 825, the listing search system 150 visually distinguishes the first subset of listings from the second subset of listings on a map-based GUI that represents the plurality of listings matching the search criteria, as discussed above.

In some examples, the listing search system 150 represents (or generates a representation, such as a visual indicator for) each of the first subset of listings on the map-based GUI using a first set of pins corresponding to a first pin type. The listing search system 150 represents (or generates a representation, such as a visual indicator for) each of the second subset of listings on the map-based GUI using a second set of pins corresponding to a second pin type.

In some examples, each pin in the first set of pins and the second set of pins is placed on the map-based GUI at a point corresponding to the respective location of a respective listing associated with the pin. In some examples, the first pin type causes information associated with a respective listing to be displayed on a corresponding pin, and wherein the second pin type prevents display of information for a corresponding listing.

In some examples, the listing search system 150 obtains information associated with a first listing from the first subset of listings and presents the information in a first pin of the first set of pins on the map-based GUI. The listing search system 150 concurrently with presenting the first pin, presenting a second pin of the second set of pins excluding information associated with a second listing of the second subset of listings.

In some examples, the listing search system 150 receives input that zooms the map-based GUI into a region associated with the second pin. The listing search system 150, in response to receiving the input, zooms the map-based GUI into the region associated with the second pin and causing the second pin to be associated with the first pin type instead of the second pin type. In some examples, the listing search system 150 obtains the information associated with the second listing and presents the information associated with the second listing in the second pin after associating the second pin with the first pin type.

In some examples, the listing search system 150 obtains ranking information for the listings in the first subset of listings and compares the ranking information for the listings in the first subset of listings to a ranking criterion. The listing search system 150, in response to comparing the ranking information to the ranking criterion, visually distinguishes a first portion of the first subset of listings from a second portion of the first subset of listings on the map-based GUI.

In some examples, the first portion of the first subset of listings includes listings in the first subset of listings for which the ranking information satisfies the ranking criterion and the second portion of the first subset of listings includes listings in the first subset of listings for which the ranking information fails to satisfy the ranking criterion. In some examples, the listing search system 150 represents each of the first portion of the first subset of listings on the map-based GUI using a first set of pins corresponding to a first pin type and represents each of the second portion of the first subset of listings on the map-based GUI using a first set of pins corresponding to a first pin type.

In some examples, the listing search system 150 determines whether a quantity of listings in the first portion of the first subset of listings transgress a threshold quantity. The listing search system 150, in response to determining that the quantity of listings in the first portion transgress the threshold quantity, represents the first portion and the second portion of the first subset of listings using a same type of pin. In some examples, the listing search system 150 determines that a first quantity of listings in the first portion exceed a second quantity of listings in the second portion by a threshold quantity. The listing search system 150, in response to determining that the first quantity of listings in the first portion exceeds the second quantity of listings in the second portion by the threshold quantity, represents the first portion and the second portion of the first subset of listings using a same type of pin.

In some examples, the listing search system 150 receives input including a selection of a pin used to represent an individual listing of the first subset of listings or the second subset of listings on the map-based GUI. The listing search system 150, in response to receiving input including the selection of the pin used to represent the individual listing, modifies a display attribute of the pin to indicate the pin has been previously selected. In some examples, the listing search system 150 identifies a region of the map-based GUI that includes a group of listings associated with ranking information that fails to satisfy a ranking criterion and represents the group of listings on the map-based GUI using pins of a second type while representing the first subset of listings using pins of a first type in response to determining that the group of listings is associated with the ranking information that fails to satisfy the ranking criterion.

In some examples, the listing search system 150 searches for additional listings that match a portion of the search criteria and that are associated with respective locations that are beyond a region currently displayed on the map-based GUI and stores the additional listings as pre-fetched listings. In some cases, the respective locations correspond to locations that are within a threshold distance of a boundary of the region. In some examples, the listing search system 150 receives input that navigates the map-based GUI to display a new geographical region that is currently not represented in the map-based GUI. The listing search system 150 identifies a portion of the pre-fetched listings that correspond to one or more locations associated with the new geographical region without performing a new search for listings in the new geographical region that match the portion of the search criteria and displays the new geographical region on the map-based GUI along with representations of the portion of the pre-fetched listings. In some examples, the threshold distance is computed based on a user profile.

Figure 9:
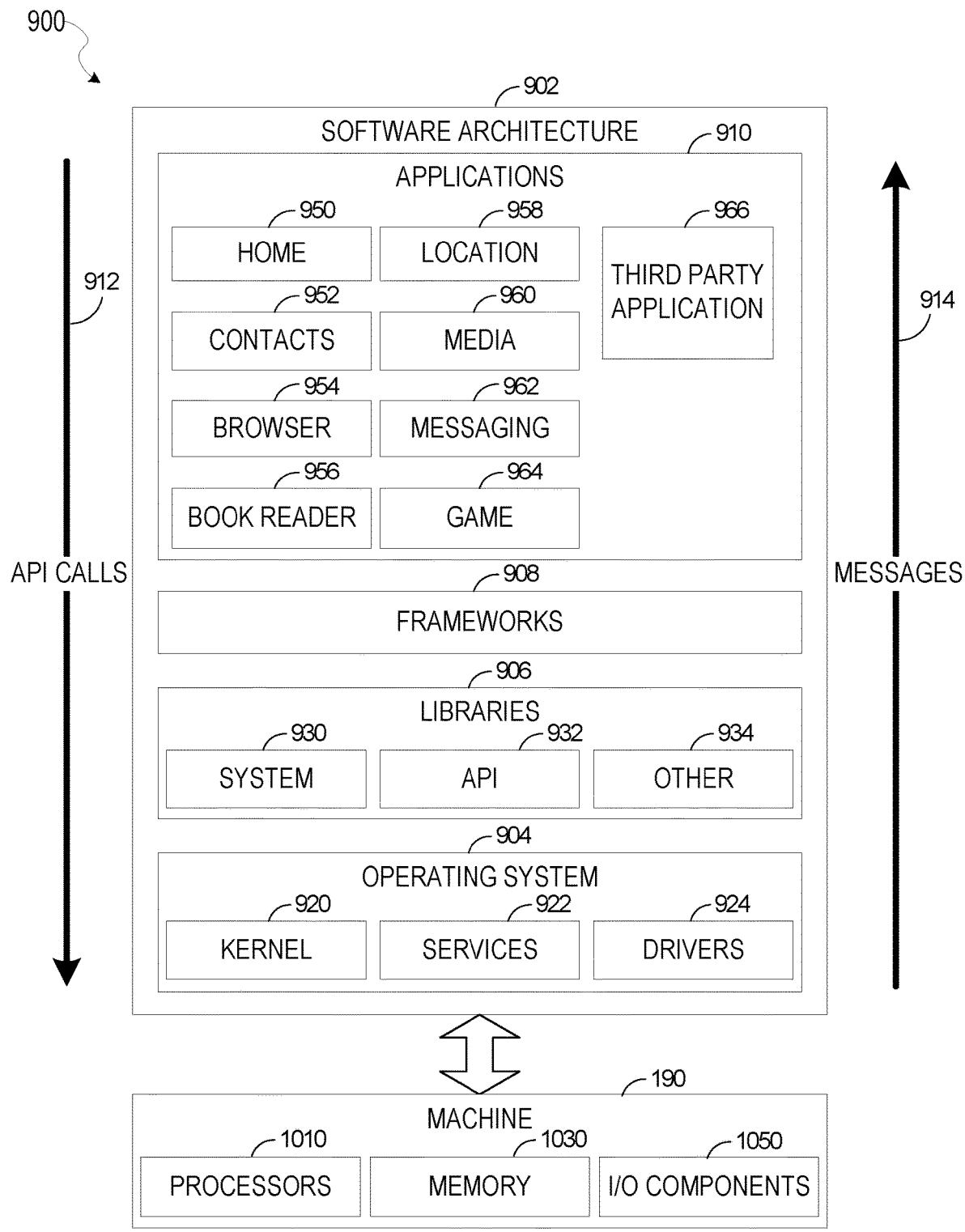
FIG. 9 is a block diagram illustrating the architecture of software used to implement the disclosed system, according to some examples.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1000 of FIG. 10 that includes processors 1010, memory 1030, and input/output (I/O) components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate the functionality described herein.

Figure 10:
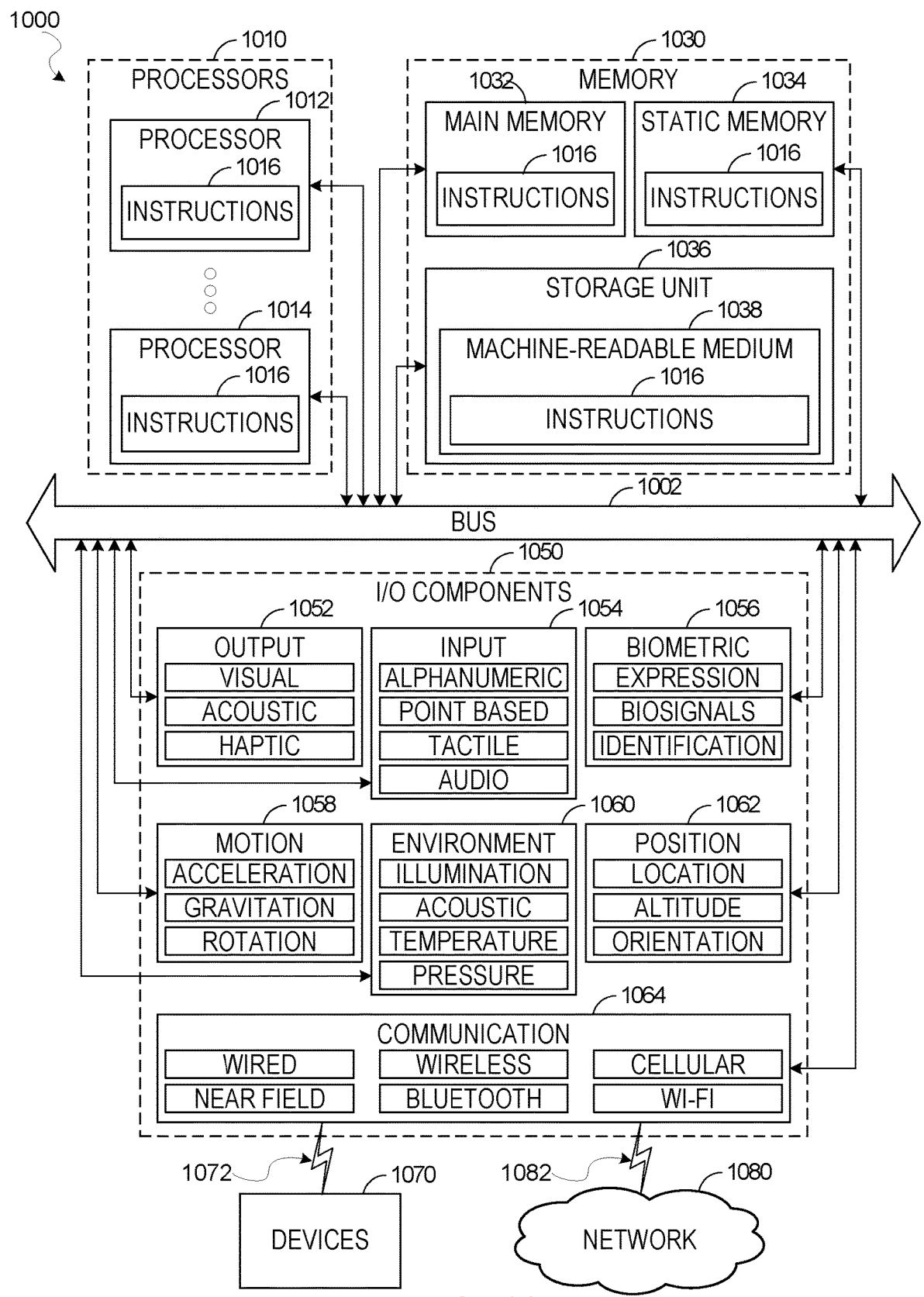
FIG. 10 shows a machine as an example computer system with instructions to cause the machine to implement the disclosed system, according to some examples.

FIG. 10 illustrates a diagrammatic representation of a machine 1000 in the form of a computer system within which a set of instructions may be executed for causing the machine to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, an STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 may include a main memory 1032, a static memory 1034, and a storage unit 1036, all accessible to the processors 1010 such as via the bus 1002. The main memory 1032, the static memory 1034, and storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or storage unit 1036 may store one or more sets of instructions and data structures (e.g., software) embodying or utilized by any one or more of the methodologies or functions described herein. These instructions (e.g., the instructions 1016), when executed by processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a VPN, an LAN, a WLAN, a WAN, a WWAN, an MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A method comprising:
   receiving, by a network site of a listing network platform, input comprising search criteria associated with a geographical region;
   identifying a plurality of listings matching the search criteria;
   identifying a first subset of listings of the plurality of listings that is each associated with a respective location that is within a boundary associated with the geographical region;
   identifying a second subset of listings of the plurality of listings that is each associated with a respective location that is outside the boundary associated with the geographical region;
   obtaining ranking information for listings in the first subset of listings;
   using the ranking information to identify a first portion of the first subset of listings and a second portion of the first subset of listings, the first portion of the first subset of listings being associated with ranking information that transgresses a ranking threshold and the second portion of the first subset of listings being associated with ranking information that fails to transgress the ranking threshold, the first portion being visually distinguished from the second portion of the first subset of listings;
   comparing a quantity of listings in the first portion of the first subset of listings to a threshold quantity;
   in response to determining that the quantity of listings in the first portion transgresses the threshold quantity, representing the first portion and the second portion of the first subset of listings using a same type of pin comprising a first pin type, the first pin type causing information associated with a respective listing to be displayed on a corresponding pin; and
   visually distinguishing the first subset of listings from the second subset of listings on a map-based graphical user interface (GUI) that represents the plurality of listings matching the search criteria, each of the second subset of listings being represented on the map-based GUI using a second pin type that prevents display of information for a corresponding listing.

2. The method of claim 1, further comprising:
   representing each of the first subset of listings on the map-based GUI using a first set of pins corresponding to the first pin type; and
   representing each of the second subset of listings on the map-based GUI using a second set of pins corresponding to the second pin type.

3. The method of claim 2, wherein each pin in the first set of pins and the second set of pins is placed on the map-based GUI at a point corresponding to the respective location of a respective listing associated with the pin.

4. The method of claim 1, further comprising:
   obtaining information associated with a first listing from the first subset of listings;
   presenting the information in a first pin; and
   concurrently with presenting the first pin, presenting a second pin excluding information associated with a second listing of the second subset of listings.

5. The method of claim 4, further comprising:
   receiving input to zoom the map-based GUI into a region associated with the second pin; and
   in response to receiving the input, zooming the map-based GUI into the region associated with the second pin and causing the second pin to be associated with the first pin type instead of the second pin type.

6. The method of claim 5, further comprising:
   obtaining the information associated with the second listing; and
   presenting the information associated with the second listing in the second pin after associating the second pin with the first pin type.

7. The method of claim 1, further comprising:
representing each of the first portion of the first subset of listings on the map-based GUI using a first set of pins corresponding to the first pin type; and
representing each of the second portion of the first subset of listings on the map-based GUI using a second set of pins corresponding to the second pin type.

8. The method of claim 1, further comprising:
determining that a first quantity of listings in the first portion exceed a second quantity of listings in the second portion by another threshold quantity; and
in response to determining that the first quantity of listings in the first portion exceeds the second quantity of listings in the second portion by the another threshold quantity, representing the first portion and the second portion of the first subset of listings using a same type of pin.

9. The method of claim 1, further comprising:
receiving input comprising a selection of a pin used to represent an individual listing of the first subset of listings or the second subset of listings on the map-based GUI; and
in response to receiving input comprising the selection of the pin used to represent the individual listing, modifying a display attribute of the pin to indicate the pin has been previously selected.

10. The method of claim 1, further comprising:
identifying a region of the map-based GUI that includes a group of listings associated with ranking information that fails to satisfy a ranking criterion; and
representing the group of listings on the map-based GUI using pins of the second type while representing the first subset of listings using pins of the first type in response to determining that the group of listings is associated with the ranking information that fails to satisfy the ranking criterion.

11. The method of claim 1, further comprising:
searching for additional listings that match a portion of the search criteria and that are associated with respective locations that are beyond a region currently displayed on the map-based GUI; and
storing the additional listings as pre-fetched listings.

12. The method of claim 11, wherein the respective locations correspond to locations that are within a threshold distance of a boundary of the region.

13. The method of claim 12, further comprising:
receiving input that navigates the map-based GUI to display a new geographical region that is currently not represented in the map-based GUI;
identifying a portion of the pre-fetched listings that correspond to one or more locations associated with the new geographical region without performing a new search for listings in the new geographical region that match the portion of the search criteria; and
displaying the new geographical region on the map-based GUI along with representations of the portion of the pre-fetched listings.

14. The method of claim 12, wherein the threshold distance is computed based on a user profile.

15. A system comprising:
one or more processors of a machine; and
a memory storing instruction that, when executed by the one or more processors, cause the machine to perform operations comprising:
receiving, by a network site of a listing network platform, input comprising search criteria associated with a geographical region;
identifying a plurality of listings matching the search criteria;
identifying a first subset of listings of the plurality of listings that is each associated with a respective location that is within a boundary associated with the geographical region;
identifying a second subset of listings of the plurality of listings that is each associated with a respective location that is outside the boundary associated with the geographical region;
obtaining ranking information for listings in the first subset of listings;
using the ranking information to identify a first portion of the first subset of listings and a second portion of the first subset of listings, the first portion of the first subset of listings being associated with ranking information that transgresses a ranking threshold and the second portion of the first subset of listings being associated with ranking information that fails to transgress the ranking threshold, the first portion being visually distinguished from the second portion of the first subset of listings;
comparing a quantity of listings in the first portion of the first subset of listings to a threshold quantity;
in response to determining that the quantity of listings in the first portion transgresses the threshold quantity, representing the first portion and the second portion of the first subset of listings using a same type of pin comprising a first pin type, the first pin type causing information associated with a respective listing to be displayed on a corresponding pin; and
visually distinguishing the first subset of listings from the second subset of listings on a map-based graphical user interface (GUI) that represents the plurality of listings matching the search criteria, each of the second subset of listings being represented on the map-based GUI using a second pin type that prevents display of information for a corresponding listing.

16. The system of claim 15, the operations comprising:
receiving input that navigates the map-based GUI to display a new geographical region that is currently not represented in the map-based GUI;
identifying a portion of listings that correspond to one or more locations associated with the new geographical region without performing a new search for listings in the new geographical region that match the portion of the search criteria; and
displaying the new geographical region on the map-based GUI along with representations of the portion of listings.

17. The system of claim 15, the operations comprising:
searching for additional listings that match a portion of the search criteria and that are associated with respective locations that are beyond a region currently displayed on the map-based GUI; and
storing the additional listings as pre-fetched listings.

18. A non-transitory machine-readable storage device embodying instructions that, when executed by a machine, cause the machine to perform operations comprising:
receiving, by a network site of a listing network platform, input comprising search criteria associated with a geographical region;
identifying a plurality of listings matching the search criteria;

identifying a first subset of listings of the plurality of listings that is each associated with a respective location that is within a boundary associated with the geographical region;

identifying a second subset of listings of the plurality of listings that is each associated with a respective location that is outside the boundary associated with the geographical region;

obtaining ranking information for listings in the first subset of listings;

using the ranking information to identify a first portion of the first subset of listings and a second portion of the first subset of listings, the first portion of the first subset of listings being associated with ranking information that transgresses a ranking threshold and the second portion of the first subset of listings being associated with ranking information that fails to transgress the ranking threshold, the first portion being visually distinguished from the second portion of the first subset of listings;

comparing a quantity of listings in the first portion of the first subset of listings to a threshold quantity;

in response to determining that the quantity of listings in the first portion transgresses the threshold quantity, representing the first portion and the second portion of the first subset of listings using a same type of pin comprising a first pin type, the first pin type causing information associated with a respective listing to be displayed on a corresponding pin; and visually distinguishing the first subset of listings from the second subset of listings on a map-based graphical user interface (GUI) that represents the plurality of listings matching the search criteria, each of the second subset of listings being represented on the map-based GUI using a second pin type that prevents display of information for a corresponding listing.

* * * * *